United States Patent
Isaacson

(10) Patent No.: US 7,730,480 B2
(45) Date of Patent: Jun. 1, 2010

(54) SYSTEM AND METHOD FOR CREATING A PATTERN INSTALLATION BY CLONING SOFTWARE INSTALLED ANOTHER COMPUTER

(75) Inventor: Scott A. Isaacson, Kamuela, HI (US)

(73) Assignee: Novell, Inc., Provo, UT (US)

( * ) Notice: Subject to any disclaimer, the term of this patent is extended or adjusted under 35 U.S.C. 154(b) by 953 days.

(21) Appl. No.: 11/466,412

(22) Filed: Aug. 22, 2006

(65) Prior Publication Data

US 2008/0052706 A1 Feb. 28, 2008

(51) Int. Cl.
*G06F 9/445* (2006.01)
*G06F 9/45* (2006.01)

(52) U.S. Cl. .................. 717/174; 717/120; 717/175

(58) Field of Classification Search ......... 717/172–176, 717/120–122
See application file for complete search history.

(56) References Cited

U.S. PATENT DOCUMENTS

| | | | |
|---|---|---|---|
| 4,918,653 A | | 4/1990 | Johri et al. |
| 5,664,206 A | * | 9/1997 | Murow et al. .................. 704/8 |
| 5,713,024 A | | 1/1998 | Halladay |
| 5,748,890 A | | 5/1998 | Goldberg et al. |
| 5,835,777 A | | 11/1998 | Staelin |
| 5,894,571 A | | 4/1999 | O'Connor |
| 5,901,227 A | | 5/1999 | Perlman |
| 5,950,010 A | | 9/1999 | Hesse et al. |
| 5,961,593 A | | 10/1999 | Gabber et al. |
| 6,144,959 A | | 11/2000 | Anderson et al. |
| 6,205,579 B1 | * | 3/2001 | Southgate .................... 717/173 |
| 6,256,774 B1 | * | 7/2001 | O'Leary et al. ............. 717/120 |
| 6,324,691 B1 | | 11/2001 | Gazdik |
| 6,367,075 B1 | | 4/2002 | Kruger et al. |
| 6,421,777 B1 | | 7/2002 | Pierre-Louis et al. |
| 6,457,130 B2 | | 9/2002 | Hitz et al. |
| 6,460,060 B1 | | 10/2002 | Maddalozzo et al. |
| 6,493,871 B1 | * | 12/2002 | Welch et al. ................. 717/173 |
| 6,539,473 B1 | | 3/2003 | Hubacher et al. |
| 6,539,539 B1 | | 3/2003 | Larsen et al. |
| 6,606,744 B1 | * | 8/2003 | Mikurak ..................... 717/174 |

(Continued)

FOREIGN PATENT DOCUMENTS

GB 2419711 5/2006

(Continued)

OTHER PUBLICATIONS

Lymer et al, "Experience in using business scenarios to access COTS components in integrated solutions", ACM pp. 1-15, 2005.*

(Continued)

*Primary Examiner*—Anil Khatri
(74) *Attorney, Agent, or Firm*—Marger Johnson & McCollom PC

(57) ABSTRACT

A customized installation is created by allowing a user to select a pattern of software. Then software that is installed on another user's computer is identified. If the identified software belongs to the selected pattern, then an installation of the software is obtained from a database and built into a custom built installation. The identification of the software and selection of a corresponding installation includes identification of a version of the software. A requested pattern can describe the category of use of the software, or the pattern can describe a usage history. After building the customized installation, the customized installation can be installed on a new machine.

29 Claims, 12 Drawing Sheets

U.S. PATENT DOCUMENTS

| | | | |
|---|---|---|---|
| 6,651,085 B1 | 11/2003 | Woods | |
| 6,725,452 B1 | 4/2004 | Te'eni et al. | |
| 6,728,711 B2 | 4/2004 | Richard | |
| 6,735,757 B1* | 5/2004 | Kroening et al. | 717/120 |
| 6,775,829 B1* | 8/2004 | Kroening | 717/175 |
| 6,799,208 B1 | 9/2004 | Sankaranarayan et al. | |
| 6,892,382 B1* | 5/2005 | Hapner et al. | 717/174 |
| 6,928,644 B1* | 8/2005 | Kroening et al. | 717/175 |
| 6,981,028 B1 | 12/2005 | Rawat et al. | |
| 7,006,993 B1 | 2/2006 | Cheong et al. | |
| 7,013,461 B2* | 3/2006 | Hellerstein et al. | 717/177 |
| 7,016,959 B2 | 3/2006 | Dinh et al. | |
| 7,055,149 B2* | 5/2006 | Birkholz et al. | 717/172 |
| 7,093,247 B2* | 8/2006 | Ashworth et al. | 717/174 |
| 7,143,067 B1 | 11/2006 | Cheston et al. | |
| 7,181,768 B1 | 2/2007 | Ghosh et al. | |
| 7,185,047 B1 | 2/2007 | Bate et al. | |
| 7,222,218 B2 | 5/2007 | Dutt et al. | |
| 7,251,812 B1 | 7/2007 | Jhanwar et al. | |
| 7,272,815 B1 | 9/2007 | Eldridge et al. | |
| 7,284,243 B2* | 10/2007 | Burgess | 717/175 |
| 7,302,634 B2 | 11/2007 | Lucovsky et al. | |
| 7,350,075 B1 | 3/2008 | Eastham | |
| 7,353,533 B2 | 4/2008 | Wright et al. | |
| 7,356,679 B1* | 4/2008 | Le et al. | 713/1 |
| 7,398,480 B2 | 7/2008 | Zimniewicz et al. | |
| 7,398,524 B2* | 7/2008 | Shapiro | 717/175 |
| 7,424,617 B2 | 9/2008 | Boyd et al. | |
| 7,478,381 B2* | 1/2009 | Roberts et al. | 717/168 |
| 7,506,338 B2* | 3/2009 | Alpern et al. | 717/177 |
| 7,539,978 B1* | 5/2009 | Haddox et al. | 717/130 |
| 7,546,594 B2* | 6/2009 | McGuire et al. | 717/168 |
| 7,571,427 B2* | 8/2009 | Wang et al. | 717/122 |
| 7,574,706 B2* | 8/2009 | Meulemans et al. | 717/174 |
| 2002/0007330 A1 | 1/2002 | Kumar et al. | |
| 2002/0007380 A1 | 1/2002 | Bauchot et al. | |
| 2002/0010757 A1 | 1/2002 | Granik et al. | |
| 2002/0019879 A1 | 2/2002 | Jasen et al. | |
| 2002/0147974 A1 | 10/2002 | Wookey | |
| 2002/0156877 A1 | 10/2002 | Lu et al. | |
| 2002/0162030 A1 | 10/2002 | Brezak et al. | |
| 2003/0014656 A1 | 1/2003 | Ault et al. | |
| 2003/0115292 A1 | 6/2003 | Griffin et al. | |
| 2003/0126214 A1 | 7/2003 | Oliszewski | |
| 2003/0131073 A1 | 7/2003 | Lucovsky et al. | |
| 2003/0149749 A1 | 8/2003 | Carlucci et al. | |
| 2003/0195970 A1 | 10/2003 | Dinh et al. | |
| 2004/0006710 A1 | 1/2004 | Pollutro et al. | |
| 2004/0025048 A1 | 2/2004 | Porcari et al. | |
| 2004/0049697 A1 | 3/2004 | Edwards, Jr. et al. | |
| 2004/0102182 A1 | 5/2004 | Reith et al. | |
| 2004/0254976 A1 | 12/2004 | Malik et al. | |
| 2005/0002057 A1 | 1/2005 | Oe | |
| 2005/0005152 A1 | 1/2005 | Singh et al. | |
| 2005/0081055 A1 | 4/2005 | Patrick et al. | |
| 2005/0097353 A1 | 5/2005 | Patrick et al. | |
| 2005/0120054 A1 | 6/2005 | Shulman et al. | |
| 2005/0134896 A1 | 6/2005 | Koga | |
| 2005/0246588 A1 | 11/2005 | Deng et al. | |
| 2006/0021065 A1 | 1/2006 | Kamperman et al. | |
| 2006/0047657 A1 | 3/2006 | Frieder et al. | |
| 2006/0059359 A1 | 3/2006 | Reasor et al. | |
| 2006/0090208 A1 | 4/2006 | Smith | |
| 2006/0123101 A1 | 6/2006 | Buccella et al. | |
| 2006/0137000 A1 | 6/2006 | Isaacson | |
| 2006/0155838 A1 | 7/2006 | Wu et al. | |
| 2006/0230124 A1 | 10/2006 | Belfiore et al. | |
| 2006/0265597 A1 | 11/2006 | Carey et al. | |

OTHER PUBLICATIONS

Bhuta et al, "A framework for identification and resolution of interoperability mismatchs in COTS based system", IEEE IWICSS, pp. 1-6, 2007.*

Gill et al, "Resuability issues in component based development", ACM, pp. 1-5, 2003.*

Chapman et al, "Contemplating systmatic software reuse in a project centric company", ACM SAICSIT, pp. 16-26, 2008.*

"Novell ZENworks"; Wikipedia, the free encyclopedia; http://en.wikipedia.org/wiki/ZENworks; Printed on Aug. 28, 2007; pp. 1-3.

Adorno, Kerry; "Novell Delivers Industry's Most Comprehensive Systems Management Solution" ; Novell, Inc.; http://www.novell.com/news/press/novell-delivers-industrys-most-comprehensive-systems-management-solution; Aug. 14, 2007; p. 1; Waltham, Massachusetts.

James, Stan; "Outfoxed in a Nutshell"; http://getoutfoxed.com/nutshell; Printed on Aug. 28, 2007; pp. 1-3.

James, Stan; "Outfoxed in a Nutshell: What does Outfoxed add to my Browser?"; http://getoutfoxed.com/nutshell/node/106; Printed on Aug. 28, 2007; pp. 1-3.

James, Stan; "What is Outfoxed?"; http://getoutfoxed.com/about; Printed on Aug. 28, 2007; pp. 1-2.

"Abstract"; http://getoutfoxed.com/book/print/36; Printed on Aug. 28, 2007; p. 1.

"Search & Browsing"; http://getoutfoxed.com/book/print/83; Printed on Aug. 28, 2007; p. 1.

"Files & Processes"; http://getoutfoxed.com/book/print/84; Printed on Aug. 28, 2007; p. 1.

"Phishing, Spyware, Crapware, Adware"; http://getoutfoxed.com/book/print/85; Printed on Aug. 28, 2007; p. 1.

"How it Works"; http://getoutfoxed.com/book/print/87; Printed on Aug. 28, 2007; p. 1.

"Objections"; http://getoutfoxed.com/book/print/86; Printed on Aug. 28, 2007; p. 1.

"Beyond Outfoxed"; http://getoutfoxed.com/book/print/88; Printed on Aug. 28, 2007; p. 1.

"A Third Phase of Internet Search"; http://getoutfoxed.com/book/print/46; Printed on Aug. 28, 2007; p. 1-2.

"Comparison to Existing Systems"; http://getoutfoxed.com/book/print/47; Printed on Aug. 28, 2007; p. 1-3.

"Socially Aware Surfing and Shopping"; http://getoutfoxed.com/book/print173; Printed on Aug. 28, 2007; p. 1.

"Three Magic Ingredients"; http://getoutfoxed.com/book/print/32; Printed on Aug. 28, 2007; p. 1.

"Keeping Your Network Clean"; http://getoutfoxed.com/book/print/108; Printed on Aug. 28, 2007; p. 1.

"Small World Networks"; http://getoutfoxed.com/book/print/62; Printed on Aug. 28, 2007; p. 1-2.

"Calculating Levels of Trust"; http://getoutfoxed.com/book/print/112; Printed on Aug. 28, 2007; p. 1-2.

"Tagging and Folksonomy"; http://getoutfoxed.com/book/print/96; Printed on Aug. 28, 2007; p. 1.

"Objections"; http://getoutfoxed.com/book/print/35; Printed on Aug. 28, 2007; p. 1.

"What Outfoxed is Not"; http://getoutfoxed.com/book/print/34; Printed on Aug. 28, 2007; p. 1.

YourDictionary.com, Remote boot, retrieved on Jan. 5, 2010 from https:///www.yourdictionary.com/computer/remote-boot.

"Firefox Help: How To Manage Profiles"; http://www.mozilla.org/supportlfirefoxlprofile; printed on Aug. 27, 2007; pp. 1-4.

Tridgell, A. et al., "The rsync algorithm," retrieved at http://www.samba.org/rsync/tech_report/node2.html, Nov. 9, 1998, p. 1.

"XenFaq—Xen Wiki"; http://www.wiki.xensource.com/xenwiki/XenFaq; printed on Aug. 27, 2007; pp. 1-7.

Aiken, Peter et al., Microsoft Computer Dictionary; Fifth Edition; Microsoft Press; 2002.

Bailey, E.C., Maximum RPM, Red Hat Inc., 2000, ISBN 1-888172-78-9, http://www.redhat.com/docs/books/max-rpm/index.html, pp. 1-565.

Buytaert, Kris, "Linux Virtualization with Xen", LinuxDevCenter. com; http://www.linuxdevcenter.com/pub/a/linux12006/01I26/xen.html; Jan. 26, 2006; pp. 1-3.

Clark, Bryan, "A Moment of Xen: Virtualize Linux to Test Your Apps"; IBM.com; http://www-128.ibm.com/ developerworks/linuxllibrary/I-xen/; Mar. 15, 2005; pp. 1-6.

Cowan, Crispin, Arnold, Seth, Beattie, Steve, Wright, Chris, & Viega, John "Defcon Capture the Flag: Defending Vulnerable Code from Intense Attack"; USA; 2003, pp. 1-53.

Cowan, Crispin, Arnold, Seth, Beattie, Steve, Wright, Chris, & Viega, John, "Immunix & Defcon: Defending Vulnerable Code From Intense Attack"; Immunix, USA; 2003.

Cowan, Crispin, Beattie, Steve, Kroah-Hartman, Greg, PU, Carlton, Wagle, Perry, & Gligor, Virgil, "SubDomain: Parsimonious Server Security"; Proceedings of the 14th Systems Administration Conference; The Usenix Association; USA; 2000.

Forrest, Stephanie "Computer Immunnology"; ACM; Oct. 1997; pp. 88-96.

Fusco, John, "The Linux Programmer's Toolbox"; Prentice Hall; 2007; Chapter 5, "What Every Developer Should Know about the Kernel," pp. 222-224.

Garfinkel, Simson & Spafford, Gene, "Practical Unix & Internet Security"; Second edition; ISBN 1-56592-148-8; Apr. 1996; Chapters 3.1, 3.2,4.1,4.2.

Newham, C. et al., "Learning the Bash Shell," 2nd Ed., O'Reilly & Associates, 1998, p. 13.

Nemeth, Evi et al., "Linux Administration Handbook"; Prentice Hall; 2006; Chapter 12—TCP/IP Networking, pp. 276-277.

Silva, G.N., APT HOWTO, Chapter 5- Getting Information about packages, Aug. 2001, http://web.archive.org/web/20010911133902/http://www.debian.org/doc/manuals/apt-howto-ch-sourcehandling.en.html.

Silva, G.N., APT HOWTO, Chapter 6—Working with source packages, Aug. 2001, http://web.archive.org/web/20010911133902/http://www.debian.org/doc/manuals/apt-howto/ch-sourcehandling.en.html.

Rosen, Rami, "Introduction to the Xen Virtual Machine", LinuxJournal.com; http://www.linuxjournal.com/article/8540; Sep. 1, 2005; pp. 1-10.

Tanenbaum, Andrew S., "Computer Networks"; Third edition; Prentice Hall; 1996; pp. 29, 44.

Tanenbaum, Andrew; "Modern Operating Systems"; Second edition; Prentice Hall, Upper Saddle River, NJ; 2001; pp. 753-757.

"Orchestrating the Data Center with Novell ZENworks"; Novell Solution Flyer; http://www.novell.com; 2007, pp. 1-4.

"Novell ZENworks 7 Suite: Your Complete Identity-driven IT Resource Management Solution"; Novell, Inc. Product Guide; http://www.novell.com; 2006; pp. 1-11.

"Novell ZENworks Endpoint Security Management: Total Control from a Single Console"; Novell, Inc. Technical White Paper; http://www.novell.com; 2007; pp. 1-11.

"Novell ZENworks Configuration Management: Complete Systems Management to Lower Your Total Cost of Ownership"; Novell, Inc. Product Guide; http://www.novell.com; 2007; pp. 1-11.

"Novell ZENworks Orchestrator Virtual Machine Management Guide 1.1"; Novell, Inc.; http://www.novell.com; 2007; pp. 1-109.

* cited by examiner

| Pattern | Software | Version |
|---|---|---|
| . . . | . . . | . . . |
| Office | Word Processor | 1.0 |
| Office | Spreadsheet | 2.0 |
| . . . | . . . | . . . |
| Developer | C++ IDE | 1.3 |
| Developer | C++ IDE | 2.0 |
| Developer | Compiler | 4.0 |
| Developer | Version Management | 2.5 |
| . . . | . . . | . . . |

FIG. 4

SYSTEM AND METHOD FOR CREATING A PATTERN INSTALLATION BY CLONING SOFTWARE INSTALLED ANOTHER COMPUTER

FIELD OF THE INVENTION

This invention pertains to creating a customized software installation, and more particularly to creating a customized software installation including software installed on another computer.

BACKGROUND OF THE INVENTION

Setting up a new computer requires installation and configuration of software that runs on the computer. Typically, the first software that must be installed on the computer is the operating system. Once the operating system is installed, other software can then be added to provide additional features and functionality for the user of the computer. For example, there are applications that are used for word processing, accounting, computer games, etc.

Before a user can install any software, the user needs to decide which software to install. A user can choose from a variety of different operating system vendors, such as open source operating systems or closed source operating systems. Considerations that go into selection of an operating system can include ease of use, security concerns, cost, breadth of features, etc.

Once an operating system vendor is selected, the user often has to choose among a variety of different versions. Some versions are built tailored for a professional environment, while other operating system versions might be intended for home or personal use. Different versions can be used to identify particular releases of the operating system. A first version released to customers might be version 1.0. Subsequent improvements or patches can be made to the first version, resulting in an increased version of software, which might be numbered version 2.0.

After an operating system is selected and installed, the user can then choose application software to run on the operating system. Some application software is used by many different computer users, while other application software meets a need for a specific type of user. For example, a computer that is to be used as a web server might not have any use for office processing software applications. Other software applications can be categorized as multimedia software, or financial software, etc.

Most software allows for configuration, permitting the user to take advantage of the particular features of interest. This is particularly true with an operating system, which can require some configuration after installation. Configurations can affect the look and feel of the software, as well as performance issues or enablement of particular features.

While it might seem a simple task to select software to install and then use a standard configuration of the software, problems might lurk for a less sophisticated software user. Some software applications only run on particular operating systems, or a particular version of a specific operating system. Other software applications do not work well together. A standard configuration might not provide the features that a user desires, but it might not be easy for a user to determine how to appropriately change the configuration.

In fact, sometimes it is difficult to know what features can be changed through configuration. Many users do not take the time to read about all of the different features that are possible: the documentation can be overwhelming, even assuming the documentation sufficiently describes the product. Unless a user has seen a demonstration of the particular feature, or the feature has been publicized, the user might not even know that a desired feature exists in a particular software package. And even if the user knows about a feature, it might not be clear how the user can take advantage of the feature.

Accordingly, a need remains to allow a user to create a customized software installation for a computer that addresses these and other problems in the prior art.

SUMMARY OF THE INVENTION

A customized installation is created by allowing a user to identify software that is installed on another user's computer. If the identified software belongs to a requested pattern, then an installation of the software is obtained from a database and built into a custom built installation. The identification of the software and selection of a corresponding installation includes identification of a version of the software. A requested pattern can describe the category of use of the software, or the pattern can describe a usage history. After building the customized installation, the use can install the software on a new machine.

The foregoing and other features, objects, and advantages of the invention will become more readily apparent from the following detailed description, which proceeds with reference to the accompanying drawings.

BRIEF DESCRIPTION OF THE DRAWINGS

FIG. 4 shows package and version metadata for software packages in the software package storage of FIG. 1.

DETAILED DESCRIPTION OF THE PREFERRED EMBODIMENT

As discussed above, a user might wish to create a customized computer system, but be unsure of what software to install. The new user might have requirements the software needs to satisfy, but the new user might lack knowledge of which software best satisfies these requirements. To navigate through this uncertainty, the new user can rely of the expertise of another user who has created a computer system that satisfies the desires of the new user. For example, the other user might be technically savvy, or the other computer system might be designed for a use similar to that needed by the new user and is relatively stable, exhibiting few bugs while being extensively used.

The new user might want to take advantage of the other (more experienced) user's knowledge and create a computer environment that is similar to the other user's computer environment. The new user could look at the software that is installed on the other computer, and identify which versions have been installed and how the software has been configured. But because of the new user's inexperience, there could be important details about the other user's computer environment that might be easily overlooked by the new user. For example, while a cursory examination of the other user's computer might reveal which versions of the various pieces of software are installed, the specifics of how they are configured might not be so revealed. For example, the new user might be unaware that one piece of software was configured in a particular way to avoid a conflict with another piece of software.

Even when using an existing computer as a starting point for selection of software, identifying the existing software on that computer can be a tedious process of looking over another person's shoulder and writing down the different packages along with the specific versions of the software that are installed on the computer. Because some customization of software can occur during the installation of software, it might be difficult for a user to completely duplicate the installation of software that is installed on another computer. Further, the new user would need to duplicate the other user's configuration, which requires a much closer inspection of the other user's computer than might be possible.

The user of the computer could be considered an expert computer user with knowledge on what software applications are best suited for a particular use. Of course, deciding what software is "best" is subjective and usually depends on what a user's priorities are. One user might care most about security, with speed of processing being a lesser concern. Another user might be more interested in having a stable set of software packages that have been in use for a period of time, and shown to contain few bugs. Other users might conversely prefer the newest software available, even if that means having to face bugs in the newer software.

Figure 1:
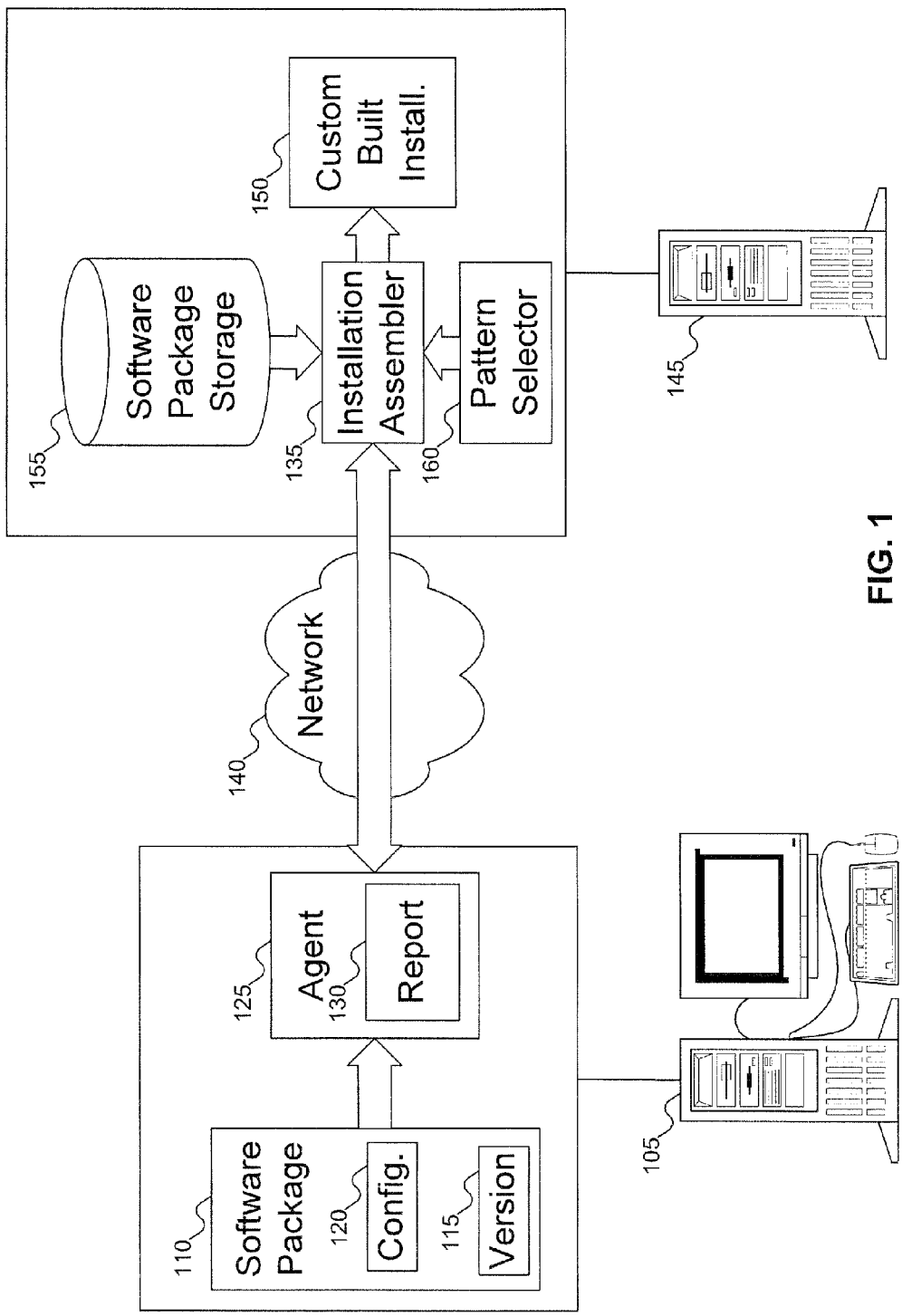
FIG. 1 shows a system to create a pattern installation for a target computer, based on an identification of software that is installed on a source computer, according to an embodiment of the invention.

FIG. 1 shows a system to create a pattern installation for a target computer, based on an identification of software that is installed on a source computer, according to an embodiment of the invention. Source computer 105 includes all the typical elements of a computer, such as a central processor, memory, bus, disk space, etc. Source computer 105 can be a computer used in business, for personal use, or recreational use. In addition, source computer 105 can be a server, computer, laptop, personal digital assistant, or other portable device. Source computer 105 includes software such as an operating system and application software that has been installed and can be executed on source computer 105. Depending on how source computer 105 is used, the software installed on the computer can vary.

Software package 110 is installed on source computer 105 and can be any type of software. For example, software package 110 can be software that is part of the operating system of source computer 105. Or software package 110 can be an application used to perform some type of processing, such as software to use email or a computer game.

In addition to serving various functions, software package 110 can also be a new version of a software package that might include bugs, or a very stable software package that has been demonstrated to be relatively bug-free. Software package 110 can be a newly released software package or software package 110 could be software that has been available for use on source computer 105 for years. It should be clear that while FIG. 1 shows only one copy of software package 110, a person skilled in the art will recognize that source computer 105 can include any number of software packages.

Software package 110 is typically identified by a title, and a version to identify the particular release of the title. Version data 115 identifies the version of software package 110. Version data 115 can represent a complete release that was installed on source computer 105. But version data 115 can also indicate that software package 110 includes a patch to an earlier version of software package 110. Software that is released to the public and distributed is typically identified as a particular version of the software. The version could be an alpha or a beta version, or it could be an official release with a complete set of components. Version data 115 can also identify a patch to software package 110 that has been installed on source computer 105 for additional functionality or to fix bugs that are present in the earlier release. Version data 115 represents this information.

Software package 110 can also include configuration data 120. Configuration data 120 can enable and disable features in software package 110. Configuration data 120 can also determine the look and feel of software package 110. In an embodiment of the invention, the user of source computer 105 has personally configured software package 110 to create configuration data 120, rather than using a default configuration. As a result, software package 110 might execute differently according to the preferences of the user of source computer 105.

Each software package on source computer 105 can include its own version and configuration data. In addition, configuration data 120 can be included in a single file or distributed among more than one configuration file, depending on the software package. The format of configuration data 120 can also vary. It can be a simple text file, or a file in a propriety format.

In addition to software package 110, source computer also includes agent 125 (in fact, agent 125 can itself be a software package.) Agent 125 can identify software package 110 (and other software packages) as well as configuration data 120 and version data 130. In an embodiment of the invention, agent 125 generates a software inventory report 130 that lists the software found on source computer 105. Software inventory report 130 is described in greater detail with reference to FIG. 2.

A user wishing to create a customized installation using the software installed on source computer 105 can use installation assembler 135 to access software inventory report 130 via network 140. Network 140 can be any network, such as a LAN, WAN, the Internet, etc., which can be reached via either a wired or a wireless (such as IEEE 802.11a/bg/n, among others) connection. Installation assembler 135 is shown on computer 145 along with other components that enable a user to create custom-built installation 150 based on software installed on source computer 105.

In an embodiment of the invention, installation assembler 135 uses software package storage 155 and the software inventory reported by agent 125 to determine if an identified software package conforms to a selected pattern. Software package storage 155 can include information on what software packages are available for installation, as well as version information and pattern information. For example, agent 125 can transmit software inventory report 130 to installation assembler 135. The cloning user can then use pattern selector 160 to select a software pattern, such as a financial pattern. Using the software inventory report, installation assembler 135 identifies software package 110 and looks up software package 110 in software package storage 155. Once the particular software package is identified in software package storage 155, metadata for the software package can specify if software package 110 is part of the financial pattern. If software package 110 is part of the financial pattern, then it can be included in custom-built installation 150.

In an embodiment of the invention, pattern selector 160 is used by the new user to identify the types of software that the new user is interested in installing on computer 105. Pattern selector 160 can include types of uses or functions, as discussed below with reference to FIG. 3. Pattern selector 160 can also allow selection of software based on usage patterns of the software. Usage patterns are described in greater detail below with reference to FIG. 4.

In an embodiment of the invention, agent 125 can generate an inventory report of the software found on computer 105 for selection by the new user. The new user can then select a subset of the software identified in the inventory report for custom built installation 150. This embodiment might be preferred for a new user who is moderately familiar with the software the user is interested in, but the new user would still like to defer to the expert user's judgment in determining which particular version of a software package is best, or how to optimally configure the software.

FIG. 1 shows software package storage 155, installation assembler 135, pattern selector 160, and custom built installation 150 all residing on computer 145. In an embodiment of the invention, computer 145 can be accessed by the cloning user remotely over the network, in order to assemble custom-built installation 150. In an embodiment of the invention, computer 145 is not the target computer, but instead is a computer that is used remotely by the cloning user. The custom-built installation can then be transmitted to the target computer remotely, as described below with reference to FIG. 7.

In addition, the features that are used to create custom-built installation 150 are not required to be installed on computer 145, but instead could be on different computers connected to source computer 105 via a network. Finally, in an embodiment of the invention, it is not necessary for all of the elements shown on FIG. 1 to reside on the same computer, but instead, these elements simply should be able to interact with one another, whether over a network or on the same computer or server.

Figure 2:
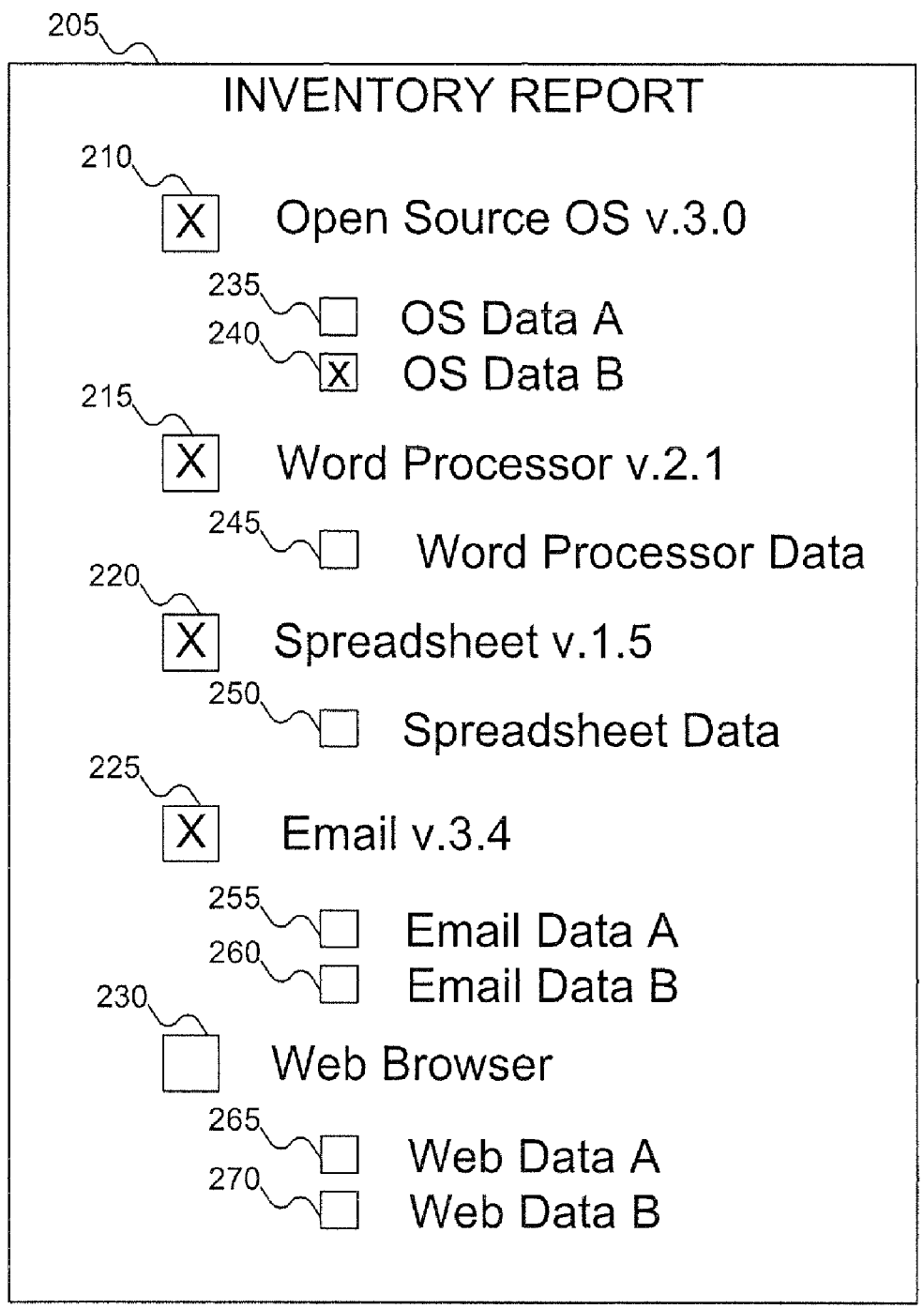
FIG. 2 shows a software inventory report generated by the agent on the source computer of FIG. 1.

FIG. 2 shows a software inventory report generated by the agent on the source computer of FIG. 1. Inventory report 205 displays a set of software inventory that agent 125 has identified on source computer 105 and can be reported to users wishing to "clone" software on source computer 105. In an embodiment of the invention, inventory report 205 includes all software that is on source computer 105. FIG. 2 shows open source operating system (OS) 210, word processor 215, spreadsheet 220, email 225 and web browser 230. Each of the software packages include associated data: for example, operating system data A 235 and operating system data B 240 are configuration data for open source OS 210. Word processor data 245 is configuration data for word processor 215. In addition, spreadsheet data 250, email data A 255, email data B 260, web data A 265, and web data B 270, are associated data for their respective applications. These various associated data can be configuration data or actual data used by the user of source computer 105, among other possibilities.

In an embodiment of the invention, the user of source computer 105 can use inventory report 205 to authorize software packages and corresponding data for cloning to target computer. In FIG. 2, open source OS 210 along with OS data B 240 are authorized to be used in building a custom-built installation. Because it is not checked, OS data A 235 is not authorized to be cloned. It could be that OS data A 235 contains information that is private or might include security information. While FIG. 2 shows at most one data file being authorized for cloning for any given piece of software, a person skilled in the art will recognize that a user can authorize all data files to be cloned.

Figure 3:
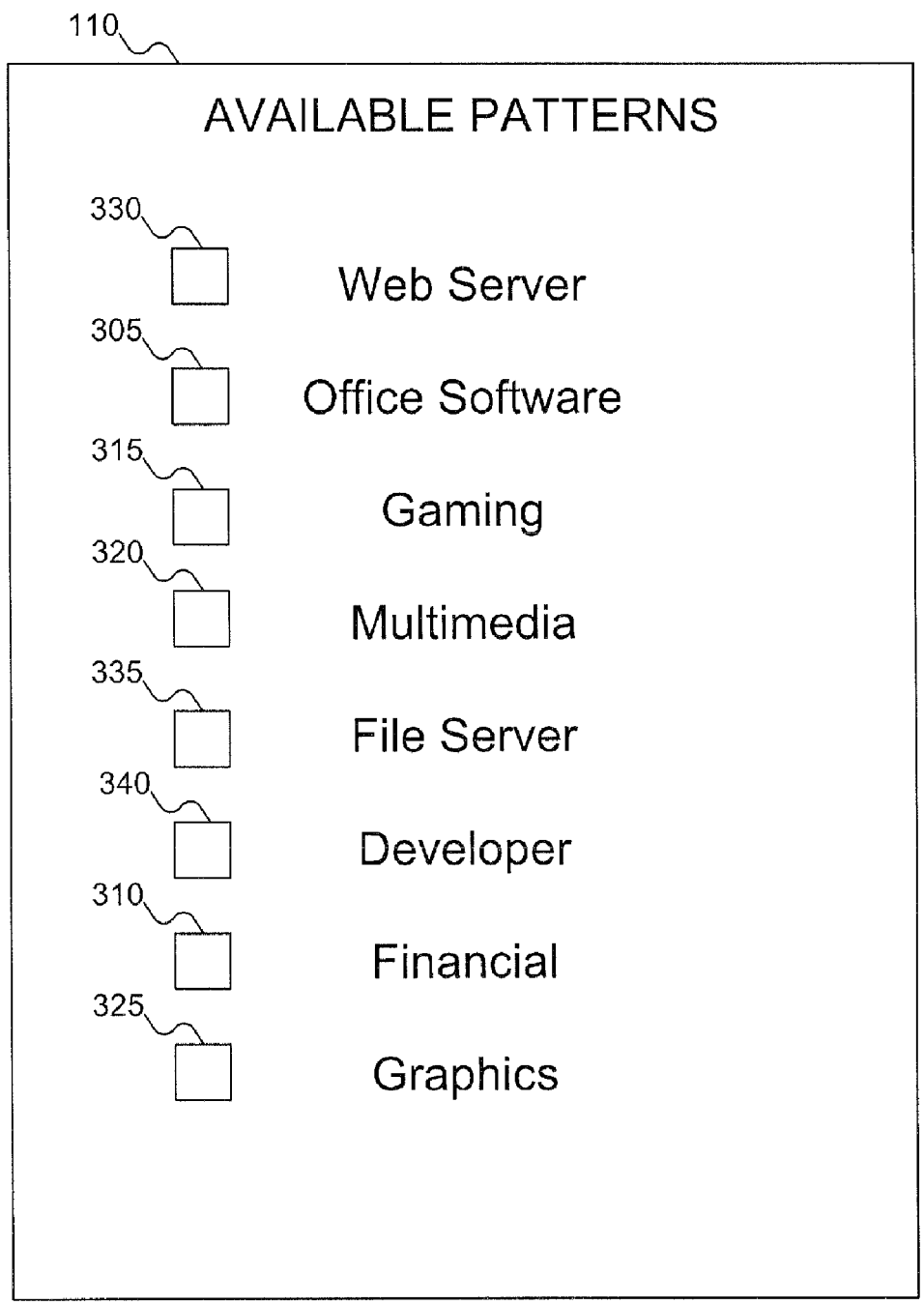
FIG. 3 shows the pattern selector of FIG. 1, with patterns available for selection.

FIG. 3 shows the pattern selector of FIG. 1, with patterns available for selection by the new user. Pattern selector 160 shows 8 different patterns that a user can select for installation on a computer. The patterns are a way for the user of the target computer to describe how the target computer is intended to be used. For example, if the computer is primarily used by an accountant to perform accounting functions, office 305 and financial 310 can be selected. If the user is a graphic artist doing work on multimedia games, the user might select gaming 315, multimedia 320, and graphics 325. A user can also choose to select web server 330 and file server 335 as desired patterns. By selecting patterns, the user does not have to know what software packages are needed to satisfy the pattern. Software package storage 155 shown in FIG. 1 includes information identifying what software packages satisfy the pattern desired by the user.

After the cloning user selects a pattern or patterns, the installation assembler can identify the authorized software reported by the agent on the source computer. Then, the installation can look up the software package in software storage 155. In an embodiment of the invention, each software in software storage 155 includes metadata describing the pattern or patterns that the software package is used.

FIG. 4 shows metadata of the software packages in the software package storage of FIG. 1 with metadata on patterns and versions. Software package storage 155 includes different software packages 405 that a user can select for install. In addition to the packages themselves, software package storage 155 also includes metadata for the software package, such as pattern identifier 410 that identifies the pattern to which the software package belongs, and version identifiers 415 to identify the version of each software installation.

A user selecting developer pattern 340 (shown in FIG. 3) would be able to install either of two different versions of integrated developer environments (IDEs), C++ IDE v.1.3 420 and C++ IDE v.2.0 425. The version (or versions) actually assembled into the custom built installation would correspond to the version (or versions) installed on source computer 105 shown in FIG. 1. Further, if other developer software is also installed on source computer 105, such as compiler 4.0 430 or version management 2.5 435, these software installations can also be assembled into custom-built installation 150 shown in FIG. 1.

Figure 5:
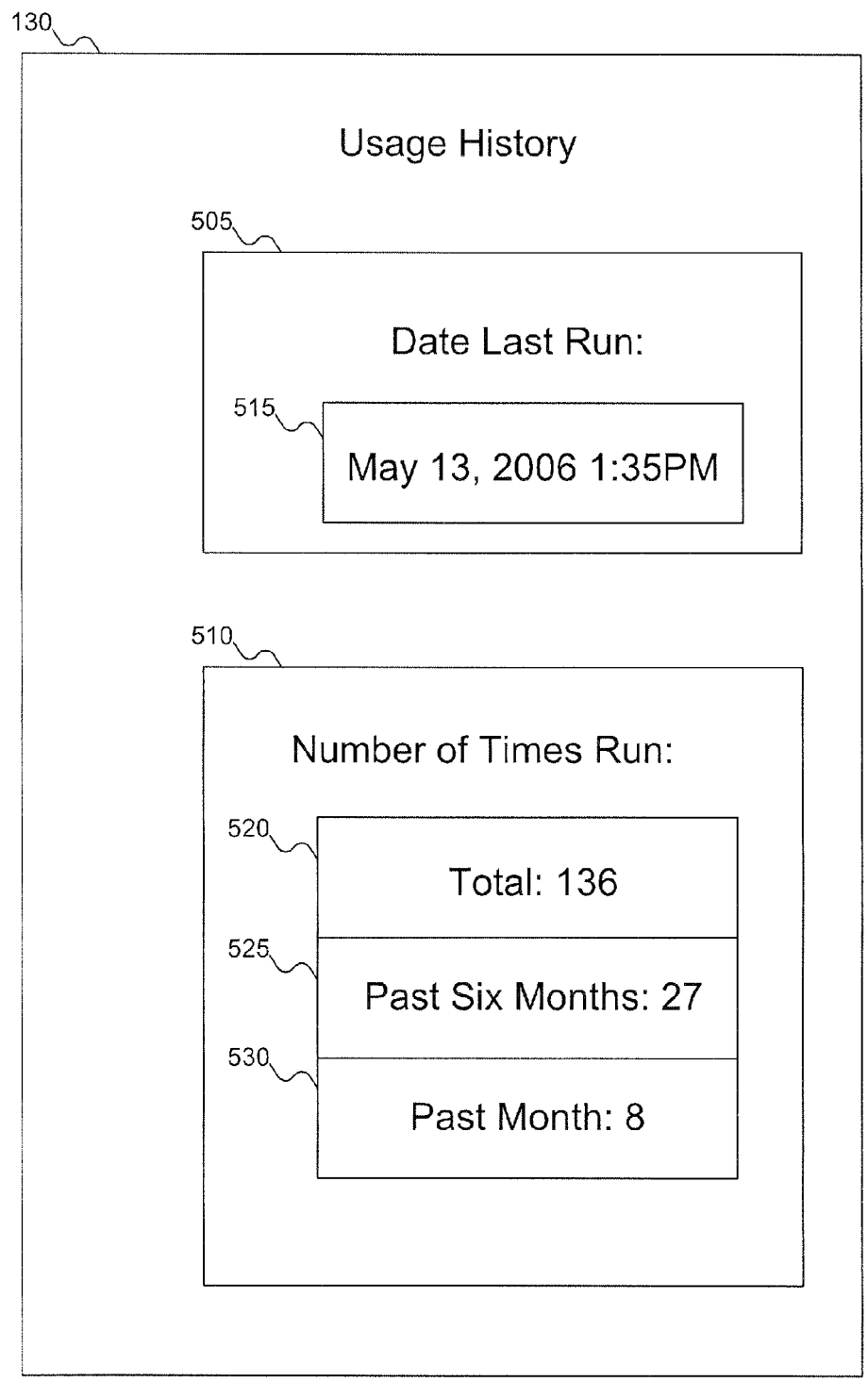
FIG. 5 shows the usage history for the software package installed on the computer of FIG. 1.

FIG. 5 shows the usage history for the software package installed on the computer of FIG. 1. Just as a cloning user might select a pattern describing a type of software for the custom-built installation, the cloning user also can select a particular usage pattern of the software. The usage patterns can specify how often a software package is executed on source computer 105 or it can describe how recently the software has been executed.

Software package 110 includes metadata on how often software package 110 has been run on computer 105. When agent 125 (shown in FIG. 1) identifies software package 110, agent 125 can also identify the usage history for software package 110 in report 130. As previously discussed, a user can select a pattern that helps agent 125 identify software on computer 105 that satisfies the desired pattern.

In another embodiment of the invention, the user can choose to install software frequently executed or recently executed by the expert user of computer 105. As agent 125 takes an inventory of the software installed on computer 105, agent 125 can also investigate how often a particular software package has been executed. The usage history included in report 130 is shown as including metadata 505 for the date last run and metadata 510 to store the number of times the software has been run in a particular time period. For example, FIG. 5 shows that metadata 505 has value 515 indicating that software package 110 was last run on May 13, 2006 at 1:35 P.M.

Metadata 510 includes values 520, 525, and 530, each representing a different time period for how many times software package 110 has been run. Value 520 indicates that software package 110 has run 136 times since being installed on computer 105. Value 525, indicates the number of times software package 110 has been run in the past six months and value 530 indicates that software package 110 has been run eight times in the past month.

While FIG. 5 shows particular usage values, metadata on software usage can also be obtained for other periods of time. The time periods can be defined differently, indicating days, weeks, and years. In addition, the usage values can be obtained by using a different process than the one shown in FIG. 5. In an embodiment of the invention, the usage history can be calculated using a log recording each instance of execution of software package 110.

A person skilled in the art will recognize that the usage history shown in report 130 can track other information. For example, usage history 130 can track information about the stability (e.g. known bug issues) of software package 110, or opinions of the user of software package 110, among other possibilities.

Figure 6:
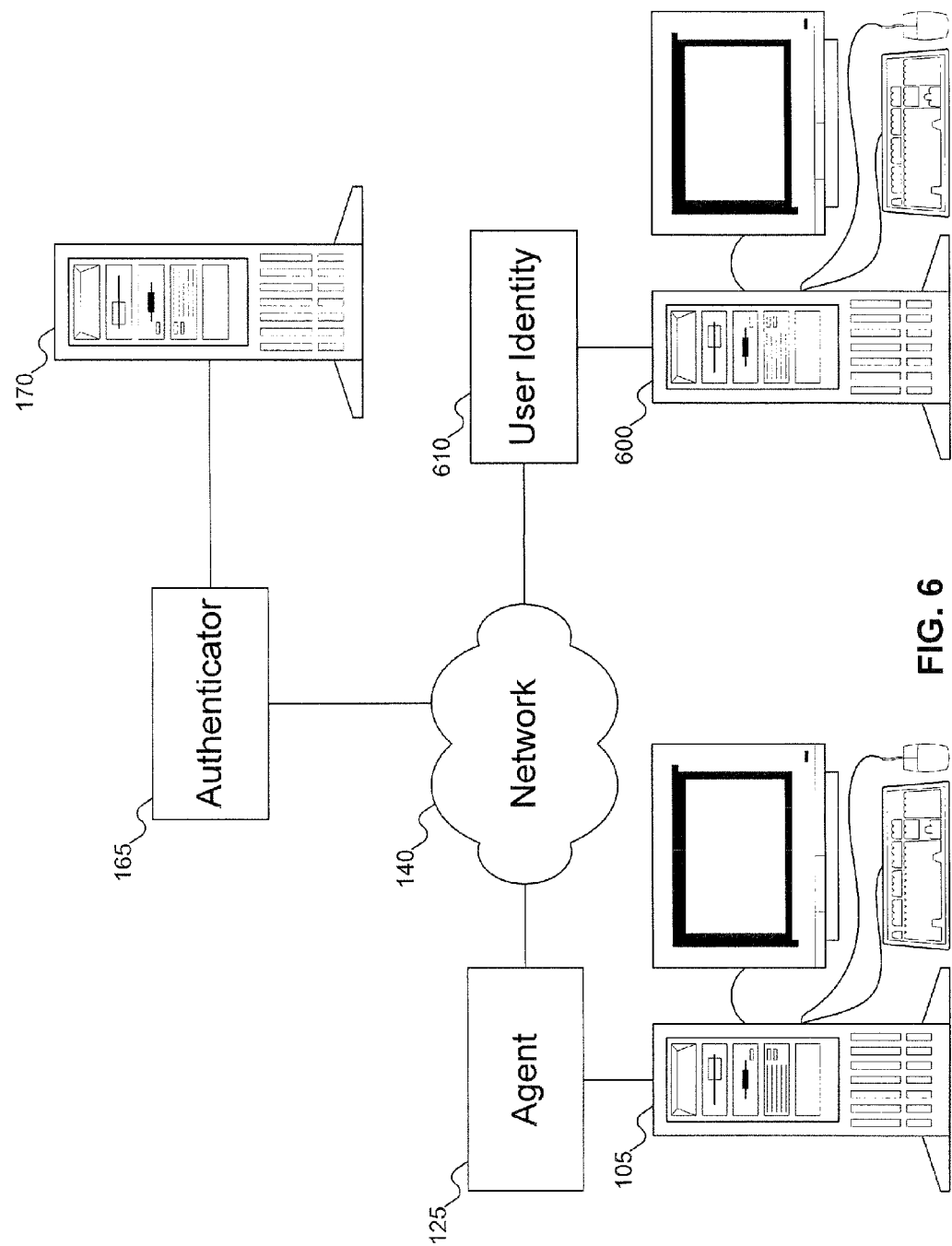
FIG. 6 shows an authenticator to authenticate a user identity before allowing the user to access the agent of FIG. 1.

FIG. 6 shows an authenticator used to authenticate a user identity before allowing the access to the agent of FIG. 1. For example, the user of the source computer might wish to allow specific users or groups of users to access the software inventory report that is generated by the agent. Authenticator 165 typically resides on server 170 that is used for authentication. Authenticator 165 allows the expert user to control who can look at the software inventory on source computer 105 and what types of files the cloning user is able to see and use for assembly into a custom-built installation. Because agent 125 is able to identify applications as well as data files on computer 105, the user of that computer is likely interested in managing what can be seen and by whom. Unauthorized use of agent 125 could create security concerns.

Authenticator 165 can be configured to allow a specific user or a class of users to use agent 125 to create a pattern software installation based on software installed on computer 105. Authenticator 165 can request a user name and password to verify the identity of the user. After a user identity is authenticated, authenticator 165 can then determine if the user identity has been also authorized to access agent 125. The user name could identify the particular user, or could be a generic user.

In addition to controlling who can use agent 125, authenticator 165 also controls what information agent 125 shows to users. Authenticator 165 could allow authorized users to see all content on computer 105, including both application information and data. Or authenticator 165 can be configured to report application information, but not configuration information or data. Authenticator 165 could also be configured to prevent access to particular applications while allowing other applications to be cloned. A person skilled in the art will recognize other ways in which authenticator 165 can be used.

As an example of how authenticator 165 can be used, the user of source computer 105 can define a list of user names that are authorized to clone source computer 105. Or, the user of source computer 105 can define a generic user name: anyone who provides the generic user name can clone source computer 105. The user of source computer 105 can also offer different levels of cloning to different user names. For example, the user of source computer 105 might allow a user providing a generic user name the ability to clone one subset of software applications from source computer 105 but not the associated configuration data, while allowing a particular user to clone both the subset of software applications and the associated configuration data. A person skilled in the art will recognize that this control over who can clone what can be generalized to any level of granularity desired by the user of source computer 105.

While authenticator 165 is described above as typically residing on server 170, in another embodiment authenticator 165 can reside on source computer 105. That is, the user desiring to clone source computer 105 would be authenticated directly by source computer 105. In another embodiment, source computer 105 includes an access list (not shown in FIG. 6) which stores the user names of properly authenticated users who can clone source computer 105 (and what software and associated data those users can clone). A person skilled in the art will recognize other ways in which authenticator 165 can be used to control the cloning of source computer 105.

Figure 7:
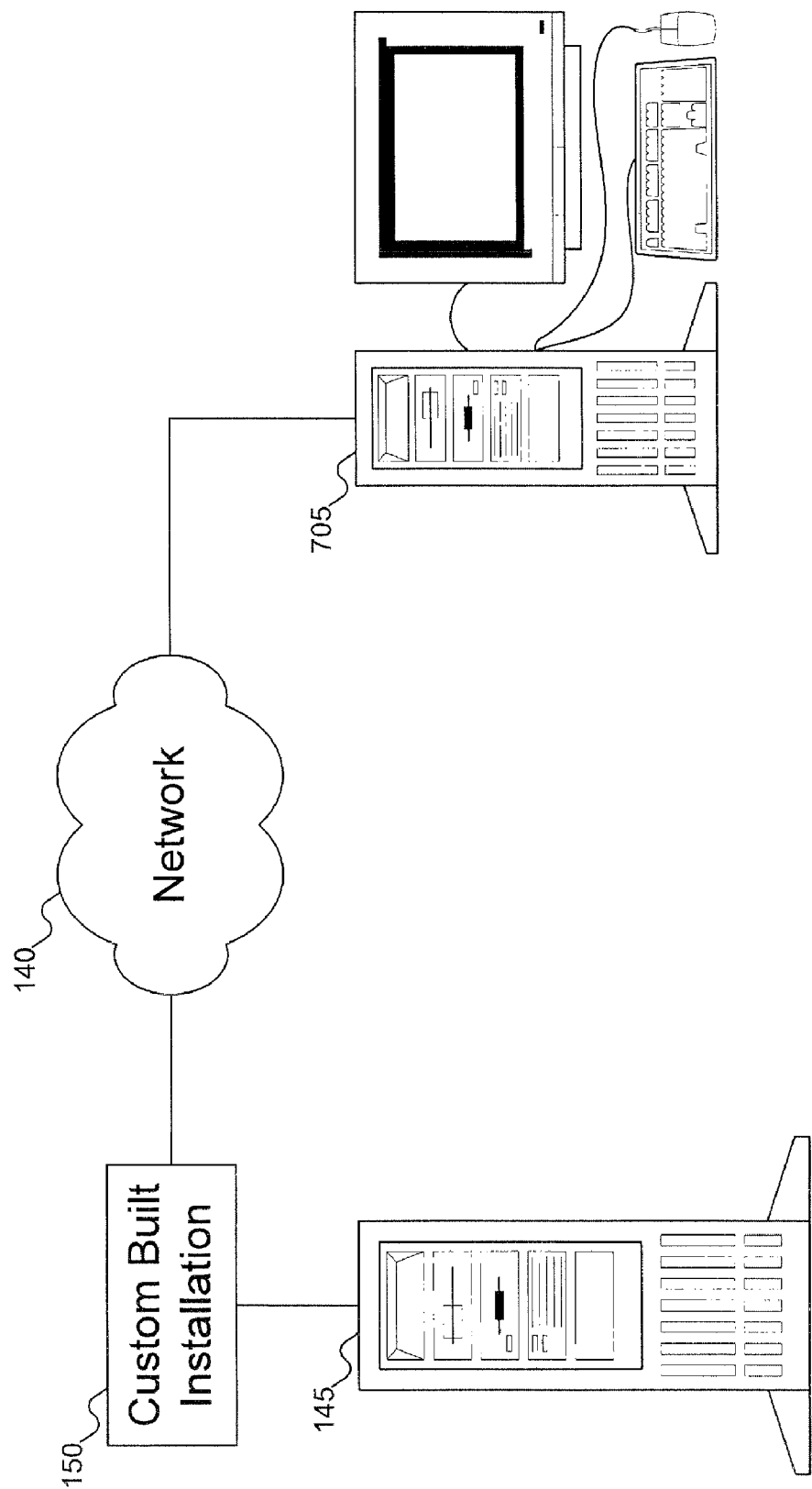
FIG. 7 shows an installation assembled using the features of FIG. 1 for installation on a target computer.

FIG. 7 shows an installation assembled using the features of FIG. 1 for installation on a target computer. Custom-built installation 150 includes software detected by agent 125 and selected from software package storage 155. After custom-built installation 150 is built, custom-built installation 150 can be deployed remotely over network 140 from server 145 to target computer 705. In another embodiment, custom-built installation 150 can be saved to a CD or other computer readable media for direct installation on target computer 705.

Although custom-built installation 150 is shown as a single installation, a person skilled in the art will recognize that custom-built installation 150 can also be a series of installations for different software packages. Custom-built installation 150 can include an operating system as well as other application software satisfying the installing user's criteria. In addition, custom-built installation 150 can also be built into a virtual machine image and deployed on a computer with a hosting operating system.

In some embodiments, custom-built installation 150 includes only the software installation. In other embodiments, custom-built installation 150 also includes configuration information for applications being installed. Custom-built installation 150 can also include data that was stored computer 105. In other words, custom-built installation 150 can include the components that the user of computer 705 desires, provided the expert user has granted the other user access to those components (using authenticator 165).

After custom-built installation 150 is deployed to computer 705, the installed software can be configured. Some software packages include a default configuration, while other software packages require configuration by the user. In cases where a user desires a configuration that is similar to the configuration that exists on computer 105 (the cloned computer), that configuration information can be included in the installation and applied to the software after it is installed on computer 705. In some embodiments, the software is configured by copying a configuration file from computer 105 to computer 705.

Figure 8:
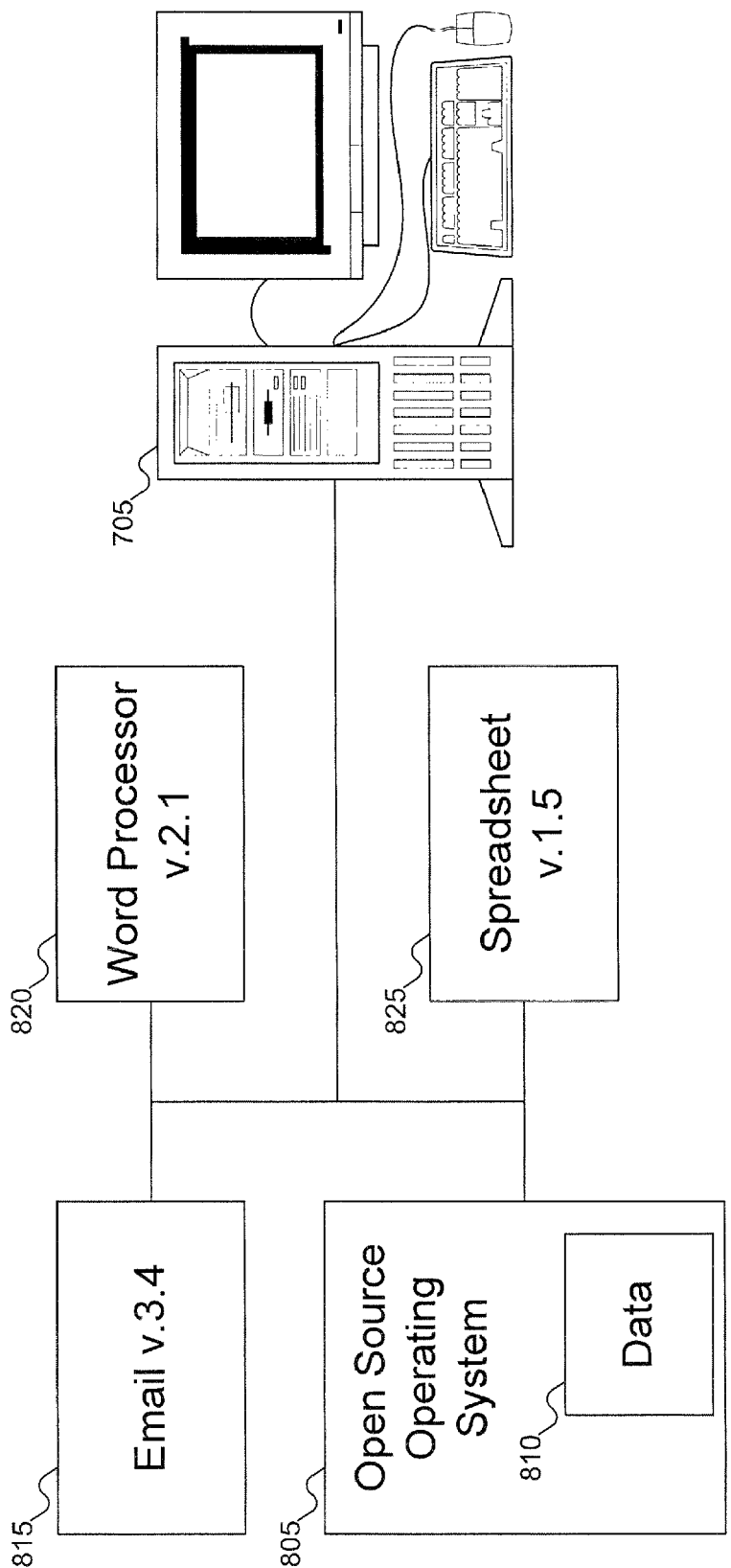
FIG. 8 shows software packages and data installed on a target computer after deployment of the custom-built installation of FIG. 1.

FIG. 8 shows the software packages and data installed on the target computer of FIG. 7 after deployment of the custombuilt installation of FIG. 7. Target computer 705 includes open source operating system 805 along with corresponding data 810. Target computer 705 also includes email 815, word processor 820, and spreadsheet 825. Note that these software packages and data correspond to the authorized software packages and data shown in FIG. 2 above.

Figure 9:
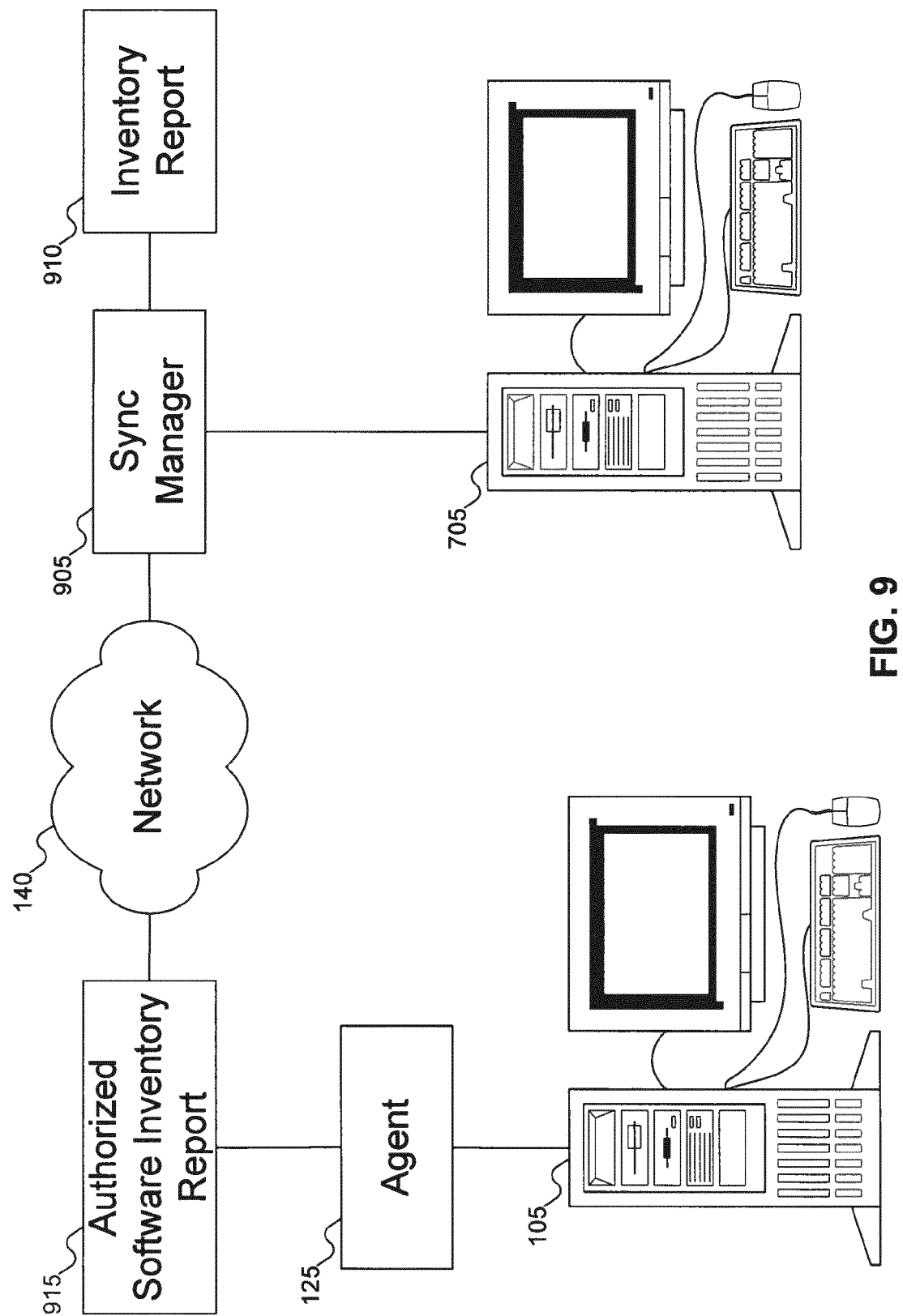
FIG. 9 shows a sync manager to keep the target computer in sync with the source computer of FIG. 1 as software packages are added to the source computer.

FIG. 9 shows a sync manager to keep the target computer of FIG. 7 in sync with the source computer of FIG. 1 as software packages are added to the source computer. It sometimes happens that the user of source computer 105 installs new software packages or installs patches to existing software packages. The user of the target computer might want the target computer to be kept in sync with source computer 105. In an embodiment of the invention, as the user of source computer 105 adds and authorizes packages for continued cloning, these added authorized packages are distributed and installed automatically in target computers that cloned the original pattern or software packages. As discussed above with reference to FIG. 2, the user of source computer 105 can generate authorized software inventory report 915 using agent 125. If the added software is new, and not well tested, the user of source computer 105 might not authorize the added software for cloning. On the other hand, the added software could be a patch to fix a major bug, and the user can authorize this patch for immediate cloning.

Target computer 705 includes sync manager 905 that is able to generate its own target computer inventory report 910. In an embodiment of the invention, sync manager 905 compares target inventor report 910 with authorized software inventory report 915. Where there is a difference in the reports, sync manager can then obtain the software that is in authorized software inventory report 915 that make sup the difference, as described with reference to FIG. 1, and install the additional software.

In an embodiment of the invention, sync manager 905 can do a comparison of the inventory reports on a periodic basis. In another embodiment, sync manager 905 can be executed by the user of the target computer. In yet another embodiment, sync manager 905 can be prompted to run by the user of source computer 105. For example, if the user has just authorized an important security patch, the user might wish that all cloning users receive that patch as soon as possible.

Finally, the use of patterns to determine which software of the available software should be cloned, can still apply as sync manager 905 maintains synchronization between target computer 705 and source computer 105.

Figure 10:
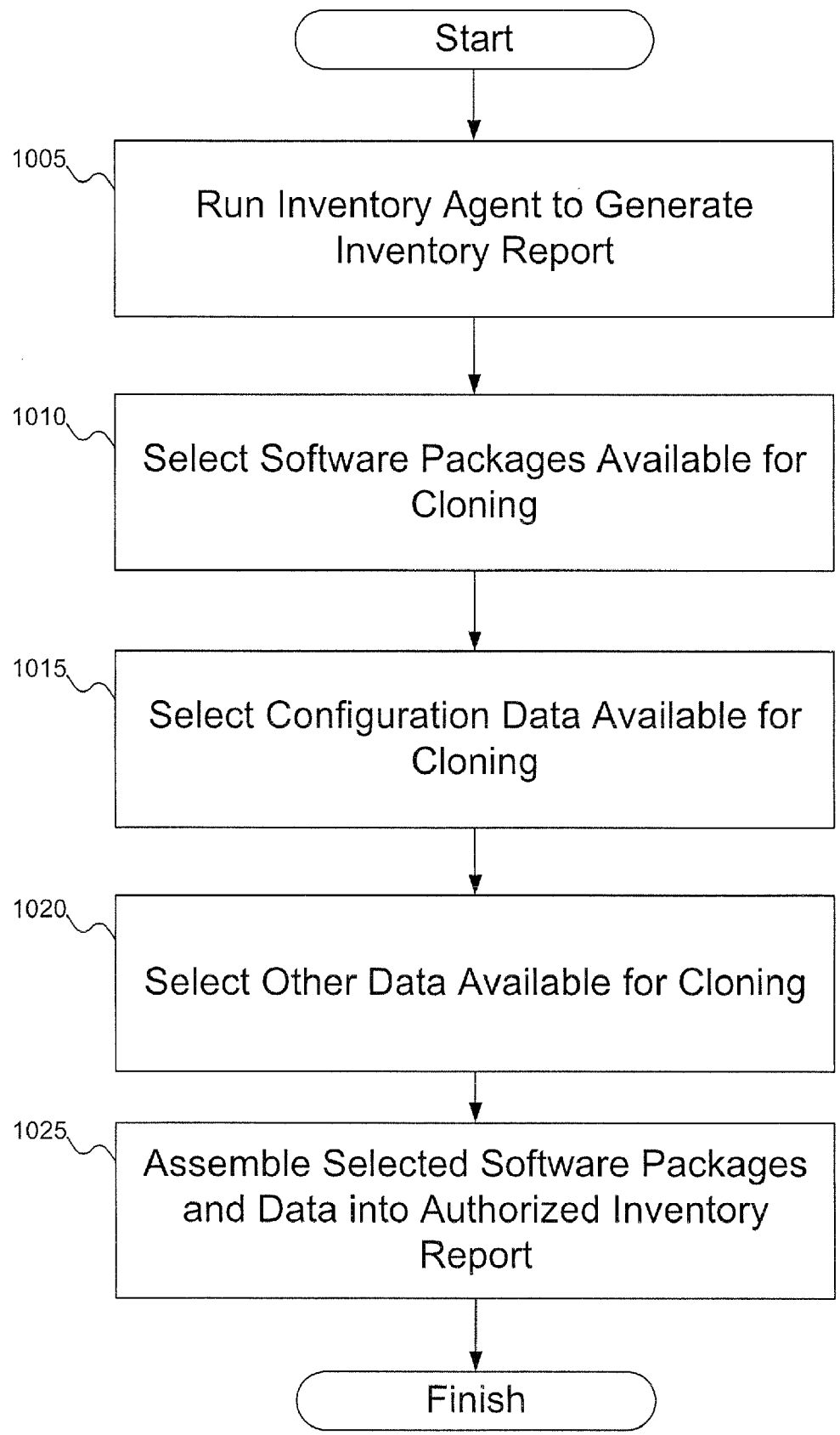
FIG. 10 shows a flowchart for the process of generating an authorized software inventory report generated by the agent of FIG. 1.

FIG. 10 shows a flowchart of the process used by the agent in FIG. 1 to authorize software and data on a source computer to be cloned on a target computer. At step 1005 the user of the source computer runs the inventory agent to generate an inventory report of the software and data on the source computer. Using the inventory report, at step 1010 the user selects software packages to be authorized for cloning. The user can authorize software any software to be cloning. In particular, the user might desire to authorize software packages that are known to be stable, software packages the user frequently uses, and software packages that have been uniquely configured to achieve interesting results.

At step 1015, the user then selects configuration data for the selected software that the user authorizes to be cloned. In determining what configuration data should be authorized, the user can select configuration data that does not implicate security concerns, and configuration data that enables selected software to perform in a unique way. In addition, the user can choose to not authorize any configuration data for cloning to a target computer.

At step 1020, the user authorizes other data associated with a selected software package to be available for cloning. Again, the user does not have to authorize any data, and can determine if data should be cloned based on security and privacy concerns, as well as a determination of how useful particular data is likely to be to another user. As discussed above, this other data is not limited to data that configures the software, but can also include other data: for example, a spreadsheet with values entered into cells can be other data.

Finally, at step 1025 all of the selected software packages and associated data that have been authorized to be cloned are assembled into an authorized inventory report. The authorized inventory report can include all software and data on a source computer, but in practice often includes a subset of the software and data on the source computer. As discussed above, some software might not be authorized because the software is new and unstable. Configuration data might not be authorized because it could comprise the user's privacy or raise security concerns. Other data might not be authorized because it is not likely to be relevant or useful to another user.

Figure 11A:
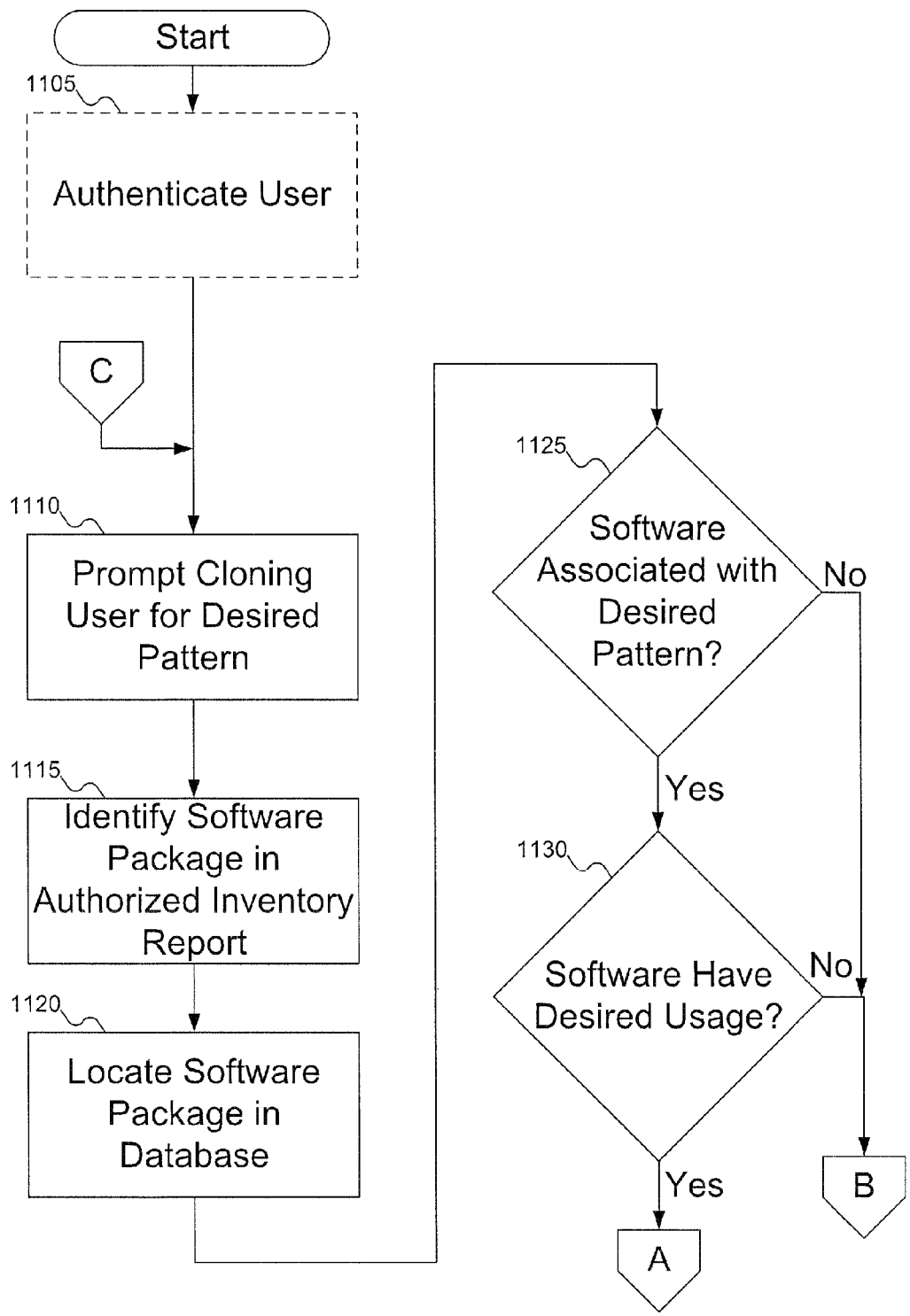
FIGS. 11A-11B show a flowchart of the process of assembling the custom-built installation of FIG. 1.
Figure 11B:
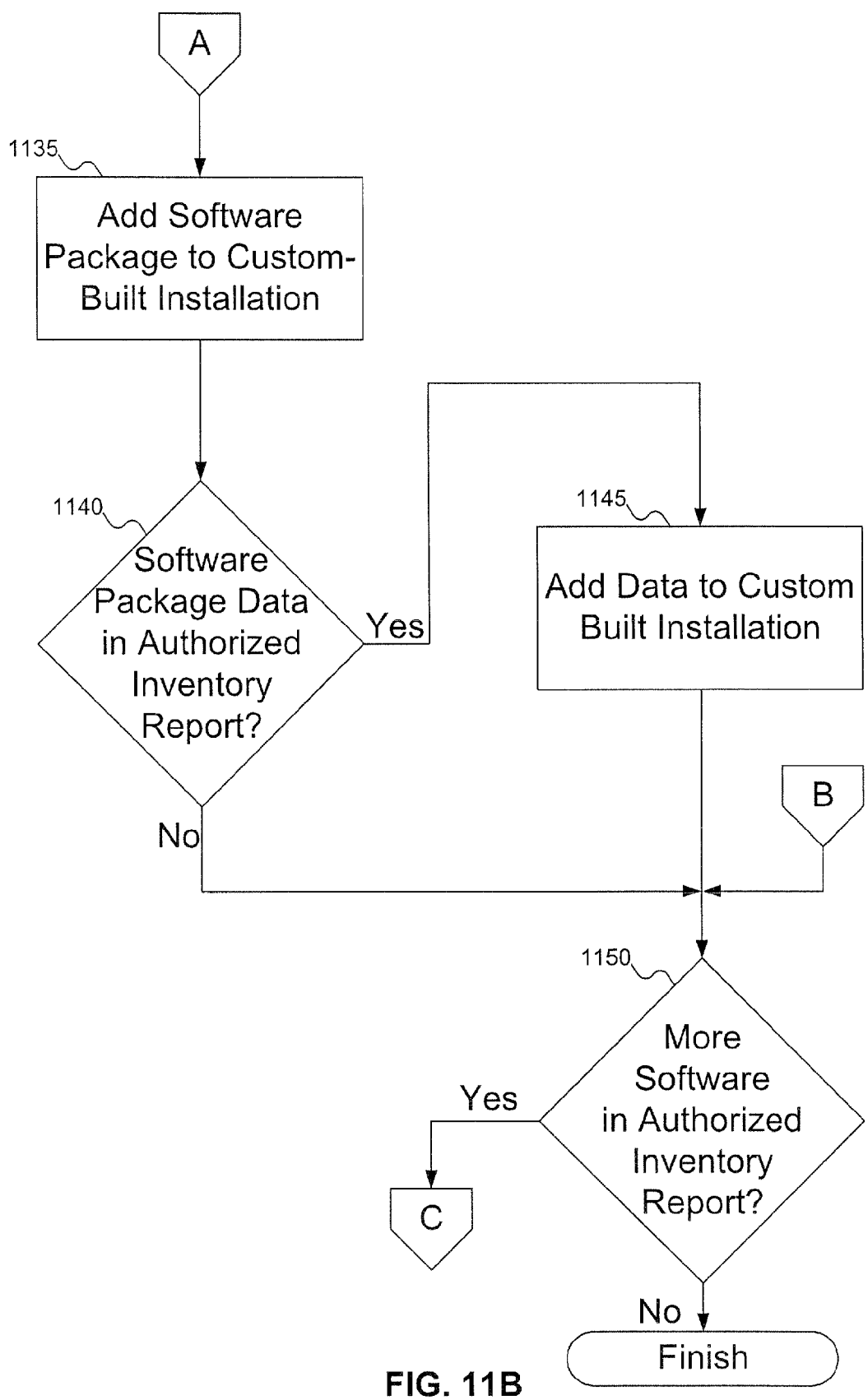

FIGS. 11A-11B show the process that is used by the installation assembler of FIG. 1 to assemble a customize software installation. In FIG. 11A, at step 1105, the user of the target computer (or cloning user) is authenticated, if appropriate. In some instances the user of the source computer might wish to authorize software and data for a particular user or group of users, rather than allowing access to any user. For example, the authorized software and data could include information that concerns the privacy or security of the user of the source computer, and control of who can access this information might be desirable. As discussed above with reference to FIG. 6, authentication can occur in any number of different ways.

At step 1110, the cloning user can be prompted to enter pattern information. As previously discussed with reference to FIG. 3, a pattern can represent a type of software for installation. As described in FIG. 5, the pattern can also represent usage information, describing how often a software package has been executed on the source computer, or how recently the software was executed.

At step 1115, the installation assembler shown in FIG. 1 identifies a software package in the authorized inventory report generated by the process shown in FIG. 10. At step 1120, the installation assembler locates the software package in the software database. At decision block 1125, the software package is evaluated to see if the software package is associated with a desired pattern. This is done by looking at what patterns, if any the cloning user has selected for assembly, and comparing that to data associated with the software package in the software database.

If the software is associated with a pattern desired by the cloning user, then at step 1130, the installation assembler determines if the software has the desired usage. For example the cloning user can specify a preference for software used frequently on the source computer, or software that was recently executed on the source computer. Selecting a desired usage of software can be a proxy to determine what software packages on a source computer are most useful or stable. Of course, this selection of a usage is merely a proxy and does not guarantee that the software conforming to desired usage patterns will in fact be more stable or useful to the cloning user.

If the software package identified in the authorized inventory report is associated with the desired pattern and has the desired usage, then at step 1135 in FIG. 11B, the installation assembler adds the software package to a custom built installation. Then at decision block 1140, the installation assembler returns to the authorized inventory report to determine if there is data (configuration data or other data) associated with the software package that is authorized for cloning to the target computer. If there is associated data that is authorized for cloning, the installation assembler copies the data from the source computer to the custom built installation at step 1145.

If the associated data is not authorized for cloning, then the data is not added to the installation. Then, at decision block 1150, if there are additional software packages in the authorized inventory report, the installation assembler repeats the process from step 1115 for each other software package listed in the authorized software inventory report. Decision block 1130 is also reached once it is determined that a software package does not conform to a desired pattern (at step 1125) or that a software pattern does not have a desired usage (at step 1130).

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments and examples, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system to create a custom built software installation that duplicates a software installation on a computer operated by a user, comprising:
    the computer;
    an agent to identify at least one software package already installed on the computer and a configuration of the software package already installed on the computer;
    an installation storage including at least one installation software package, the one installation software package supporting installation of the one software package;
    a pattern identifier to identify a pattern of use for the installation software package in the installation storage;
    a selector to select at least the installation software package from the installation storage for the software package if the pattern for the installation software package is a desired pattern of use and the one software package is installed on the computer;
    an installation assembler to assemble the selected installation software package into a custom-built installation; and
    a configuration tool to configure the software package after installation on a second computer based on the detected configuration.

2. A system according to claim 1, further comprising a pattern selector for a second user to select the desired pattern of use.

3. A system according to claim 1, wherein:
    the installation storage further includes a version for each available installation software package;
    the agent is operative to identify the version of the one software package already installed on the computer; and
    the selector is operative to select a installation software package with the identified version.

4. A system according to claim 3, further comprising:
    a second version of the one software package already installed on the computer;
    a version selector to enable selection of an installation software version from the installation storage; and
    wherein the installation assembler assembles the selected installation software version.

5. A system according to claim 1, wherein the agent is operative to identify a software package that has been run on the computer within a specified time period.

6. A system according to claim 1, wherein the agent is operative to identify a software package that has been run on the computer a specified number of times.

7. A system according to claim 1, further comprising:
a user identity associated with a second computer to identify the second user of the second computer; and
an authenticator to authenticate the identity of the second user of the second computer, so that if the second user of the second computer is authenticated, the second user is granted access to information generated by the agent and if the second user of the second computer is not authenticated, the second user is denied access to the information generated by the agent.

8. A system according to claim 1, further comprising an installer to install the custom built installation on a second computer.

9. A system according to claim 1, wherein the installation assembler is operative to assemble the selected installation software package into a custom-built installation without including any installation software packages not selected by the selector.

10. A method for creating a pattern installation for a computer, comprising the following computer microprocessor-implemented steps:
identifying a software package already installed on a first computer of a user;
locating an installation software package corresponding to the software package from a database of software installations;
assembling the corresponding installation software package into a customized installation; identifying a configuration of the software package already installed on a first computer; and
configuring the software package on the second computer after installing the software package on the second computer based on the identified configuration.

11. A method according to claim 10, wherein identifying a software package already installed on a first computer includes identifying a software package that is associated with a desired pattern of use of a second user.

12. A method according to claim 10, wherein identifying a software package already installed on a first computer includes identifying a version of the software package already installed on the first computer.

13. A method according to claim 10, wherein identifying a software package already installed on a first computer includes identifying a software package that has been run on the first computer in a specified time period.

14. A method according to claim 10, wherein identifying a software package already installed on a first computer includes identifying a software package that has been run on the first computer a specified number of times.

15. A method according to claim 10, further comprising authorizing a second user of the second computer to identify software already installed on the first computer.

16. A method according to claim 15, wherein authorizing a second user includes identifying the second user in a list of authorized users.

17. A method according to claim 15, wherein authorizing a second user includes identifying the second user with a predefined user name.

18. A method according to claim 10, wherein assembling the corresponding installation software package into a customized installation includes assembling the corresponding installation software package into the customized installation without including any software packages not already installed on the first computer of the user.

19. An article, comprising a readable storage medium, said storage medium having stored thereon instructions, that, when executed by a machine, result in:
identifying a software package already installed on a first computer;
locating an installation software package corresponding to the software package from a database of software installations;
assembling the corresponding installation software package into a customized installation;
identifying a configuration of the software package already installed on a first computer; and
configuring the software package on the second computer after installing the software package on the second computer based on the identified configuration.

20. An article according to claim 19, wherein identifying a software package already installed on a first computer includes identifying a software package that is associated with a desired pattern of use of a second user.

21. An article according to claim 19, wherein identifying a software package already installed on a first computer includes identifying a version of the software package already installed on the first computer.

22. An article according to claim 19, wherein identifying a software package already installed on a first computer includes identifying a software package that has been run on the first computer in a specified time period.

23. An article according to claim 19, wherein identifying a software package already installed on a first computer includes identifying a software package that has been run on the first computer a specified number of times.

24. An article according to claim 19, further comprising authorizing a second user of the second computer to identify software already installed on the first computer.

25. An article according to claim 24, wherein authorizing a second user includes identifying the second user in a list of authorized users.

26. An article according to claim 24, wherein authorizing a second user includes identifying the second user with a predefined user name.

27. An article according to claim 24, further comprising denying the second user information about the software already installed on the first computer if the second user is not authorized.

28. A method according to claim 15, further comprising denying the second user information about the software already installed on the first computer if the second user is not authorized.

29. An article according to claim 19, wherein assembling the corresponding installation software package into a customized installation includes assembling the corresponding installation software package into the customized installation without including any software packages not already installed on the first computer of the user.

* * * * *